(12) United States Patent
Desoli et al.

(10) Patent No.: US 12,361,268 B2
(45) Date of Patent: Jul. 15, 2025

(54) NEURAL NETWORK HARDWARE ACCELERATOR CIRCUIT WITH REQUANTIZATION CIRCUITS

(71) Applicants: STMicroelectronics S.r.l., Agrate Brianza (IT); STMicroelectronics International N.V., Geneva (CH)

(72) Inventors: Giuseppe Desoli, San Fermo Della Battaglia (IT); Surinder Pal Singh, Noida (IN); Thomas Boesch, Rovio (CH)

(73) Assignee: STMicroelectronics International N.V., Geneva (CH)

( * ) Notice: Subject to any disclaimer, the term of this patent is extended or adjusted under 35 U.S.C. 154(b) by 990 days.

(21) Appl. No.: 17/461,626

(22) Filed: Aug. 30, 2021

(65) Prior Publication Data
US 2023/0062910 A1 Mar. 2, 2023

(51) Int. Cl.
*G06N 3/063* (2023.01)
*G06F 9/50* (2006.01)
*G06N 3/048* (2023.01)

(52) U.S. Cl.
CPC .......... *G06N 3/063* (2013.01); *G06F 9/5027* (2013.01); *G06N 3/048* (2023.01)

(58) Field of Classification Search
CPC ..... G06N 3/063; G06N 3/0464; G06N 3/0495
See application file for complete search history.

(56) References Cited

U.S. PATENT DOCUMENTS

| | | |
|---|---|---|
| 5,768,613 A | 6/1998 | Asghar |
| 9,436,637 B2 | 9/2016 | Kommanaboyina |
| 9,779,786 B1 | 10/2017 | Wu et al. |
| 9,978,014 B2 | 5/2018 | Lupon et al. |
| 10,366,050 B2 | 7/2019 | Henry et al. |
| 10,372,456 B2 | 8/2019 | Fowers et al. |
| 10,402,527 B2 | 9/2019 | Boesch et al. |
| 10,657,668 B2 | 5/2020 | Hassan et al. |
| 10,949,736 B2 | 3/2021 | Deisher et al. |
| 11,227,086 B2 | 1/2022 | Boesch et al. |
| 11,270,201 B2 | 3/2022 | Sridharan et al. |
| 11,586,907 B2 | 2/2023 | Singh et al. |
| 11,610,362 B2 | 3/2023 | Singh et al. |

(Continued)

FOREIGN PATENT DOCUMENTS

| | | |
|---|---|---|
| CN | 101739241 A | 6/2010 |
| CN | 101819679 A | 9/2010 |

(Continued)

OTHER PUBLICATIONS

Wang, Jichen, Jun Lin, and Zhongfeng Wang. "Efficient hardware architectures for deep convolutional neural network." IEEE Transactions on Circuits and Systems I: Regular Papers 65.6 (2017): 1941-1953. (Year: 2017).*

(Continued)

*Primary Examiner* — Schyler S Sanks
(74) *Attorney, Agent, or Firm* — Seed IP Law Group LLP

(57) ABSTRACT

A convolutional neural network includes convolution circuitry. The convolution circuitry performs convolution operations on input tensor values. The convolutional neural network includes requantization circuitry that requantizes convolution values output from the convolution circuitry.

27 Claims, 8 Drawing Sheets

(56) References Cited

U.S. PATENT DOCUMENTS

| | | |
|---|---|---|
| 2012/0303932 A1 | 11/2012 | Farabet et al. |
| 2014/0032465 A1 | 1/2014 | Modha |
| 2014/0281005 A1 | 9/2014 | Bhamidipati et al. |
| 2015/0170021 A1 | 6/2015 | Lupon et al. |
| 2015/0212955 A1 | 7/2015 | Easwaran |
| 2015/0278596 A1 | 10/2015 | Kilty et al. |
| 2016/0379109 A1 | 12/2016 | Chung et al. |
| 2017/0169315 A1 | 6/2017 | Vaca Castano et al. |
| 2018/0046458 A1 | 2/2018 | Kuramoto |
| 2018/0046485 A1 | 2/2018 | Maity et al. |
| 2018/0121796 A1 | 5/2018 | Deisher et al. |
| 2018/0144214 A1 | 5/2018 | Hsieh et al. |
| 2018/0189229 A1 | 7/2018 | Desoli et al. |
| 2018/0189641 A1 | 7/2018 | Boesch et al. |
| 2018/0189642 A1 | 7/2018 | Boesch et al. |
| 2018/0315155 A1 | 11/2018 | Park et al. |
| 2019/0042868 A1 | 2/2019 | Oesterreicher et al. |
| 2019/0155575 A1 | 5/2019 | Langhammer et al. |
| 2019/0205746 A1 | 7/2019 | Nurvitadhi et al. |
| 2019/0205758 A1 | 7/2019 | Zhu et al. |
| 2019/0251429 A1 | 8/2019 | Du et al. |
| 2019/0266479 A1 | 8/2019 | Singh et al. |
| 2019/0266485 A1 | 8/2019 | Singh et al. |
| 2019/0266784 A1 | 8/2019 | Singh et al. |
| 2019/0354846 A1 | 11/2019 | Mellempudi et al. |
| 2019/0370631 A1 | 12/2019 | Fais et al. |
| 2020/0133989 A1 | 4/2020 | Song et al. |
| 2020/0234137 A1 | 7/2020 | Chen et al. |
| 2020/0272779 A1 | 8/2020 | Boesch et al. |
| 2021/0073450 A1 | 3/2021 | Boesch et al. |
| 2021/0073569 A1 | 3/2021 | Gao et al. |
| 2021/0192833 A1 | 6/2021 | Singh et al. |
| 2021/0240440 A1 | 8/2021 | Langhammer et al. |
| 2021/0256346 A1 | 8/2021 | Desoli et al. |
| 2021/0264250 A1 | 8/2021 | Singh et al. |
| 2022/0121928 A1 | 4/2022 | Dong et al. |
| 2022/0188072 A1 | 6/2022 | Langhammer et al. |
| 2023/0153621 A1 | 5/2023 | Singh et al. |
| 2023/0186067 A1 | 6/2023 | Singh et al. |

FOREIGN PATENT DOCUMENTS

| | | |
|---|---|---|
| CN | 104484703 A | 4/2015 |
| CN | 105488565 A | 4/2016 |
| CN | 105518784 A | 4/2016 |
| CN | 106650655 A | 5/2017 |
| CN | 106779059 A | 5/2017 |
| CN | 107016521 A | 8/2017 |
| CN | 110214309 A | 9/2019 |
| CN | 209560950 U | 10/2019 |
| CN | 210428520 U | 4/2020 |
| DE | 10159331 A1 | 6/2002 |
| EP | 3346423 A1 | 7/2018 |
| EP | 3346424 A1 | 7/2018 |
| EP | 3346427 A1 | 7/2018 |
| EP | 3480740 A1 | 5/2019 |
| JP | 2002183111 A | 6/2002 |
| KR | 101947782 B1 | 2/2019 |
| WO | 2017017371 A1 | 2/2017 |
| WO | WO 2019227322 A1 | 12/2019 |
| WO | WO 2020249085 A1 | 12/2020 |

OTHER PUBLICATIONS

Faraone, Julian, et al. "AddNet: Deep neural networks using FPGA-optimized multipliers." IEEE Transactions on Very Large Scale Integration (VLSI) Systems 28.1 (2019): 115-128. (Year: 2019).*

Wang et al., "3D Facial Reconstruction Based on 2.5D Carve System," p. 165-167, 193, 2005. (with English Abstract).

Tian et al., "Automated localization of body part in CT images," *Computer Engineering and Design* 38(1):247-252, Jan. 2017. (with English Abstract).

Milletari et al., "Hough-CNN: Deep Learning for Segmentation of Deep Brain Regions in MRI and Ultrasound," arXiv:1601.07014v3 [cs.CV], Jan. 31, 2016. (34 pages).

Yang et al., "Research on Deep Learning Acceleration Technique," URL=http://www.c-s-a.org.cn, Special Issue, Sep. 25, 2016. (9 pages) (with English Abstract).

Hara et al., "Analysis of Function of Rectified Linear Unit Used in Deep learning," European Union Conference Paper, Jul. 2015. (9 pages).

Lozito et al. "Microcontroller Based Maximum Power Point Tracking Through FCC and MLP Neural Networks," *Proceedings of the 6th European Embedded Design in Education and Research*, 2014. (5 pages).

Lozito et al., "FPGA Implementations of Feed Forward Neural Network by Using Floating Point Hardware Accelerators," *Theoretical and Applied Electrical Engineering*, 12(1):30-39, Mar. 2014.

Sodre, "Fast-Track to Second Order Polynomials," PowerPoint, UT-Austin, Aug. 2011. (12 pages).

Venieris et al., "fpgaConvNet: A Framework for Mapping Convolutional Neural Networks on FPGAs," 2016 *IEEE 24th Annual International Symposium on Field-Programmable Custom Computing Machines*, 2014, pp. 40-47.

Bhatele et al (Ed)., *Programming and Performance Visualization Tools*, Springer Publishing, New York, New York, 2018, pp. 74-89, Pradelle et al., "Polyhedral Optimization of TensorFlow Computation Graphs," 7 pages.

Blanc-Talon et al (Ed)., *Advanced Concepts for Intelligent Vision Systems*, Springer International Publishing, New York, New York, 2016, pp. 217-227, Desoli et al., "The Orlando Project: A 28nm FD-SOI Low Memory Embedded Neural Network ASIC".

Brownlee, "A Gentle Introduction to Pooling Layers for Convolutional Neural Networks," published online Apr. 22, 2019, downloaded on Dec. 11, 2019, from https://machinelearningmastery.com/pooling-layers-for convolutional-neural-networks/, 19 pages.

Chen et al., "DaDianNao: A Machine-Learning Supercomputer," 47th Annual IEEE/ACM International Symposium on Microarchitecture, Cambridge, United Kingdom, Dec. 13-17, 2014, pp. 609-622.

Chen et al., "A High-Throughput Neural Network Accelerator," IEEE Micro, 35:24-32, 2015.

Chen et al., "14.5: Eyeriss: An Energy-Efficient Reconfigurable Accelerator for Deep Convolutional Neural Networks," IEEE International Solid-State Circuits Conference, San Francisco, California, Jan. 31-Feb. 4, 2016, pp. 262-264.

Choudhary et al., "NETRA: A Hierarchical and Partitionable Architecture for Computer Vision Systems," *IEEE Transactions on Parallel and Distributed Systems* 4(10):1092-1104, 1993.

Cook, "Global Average Pooling Layers for Object Localization," published online Apr. 9, 2019, downloaded on Dec. 11, 2019, from https://alexisbcook.github.io/2017/global-average-pooling-layers-for-object-localization/, 14 pages.

Dai et al., "Deformable Convolutional Networks," PowerPoint Presentation, International Conference on Computer Vision, Venice, Italy, Oct. 22-Oct. 29, 2017, 17 pages.

Dai et al., "Deformable Convolutional Networks," Proceedings of the IEEE International Conference on Computer Vision :264-773, 2017.

Desoli et al., "14.1: A 2.9TOPS/W Deep Convolutional Neural Network SoC in FD-SOI 28nm for Intelligent Embedded Systems," *IEEE International Solid-State Circuits Conference (ISSCC)*, San Francisco, California, Feb. 5-9, 2017, pp. 238-239. (3 pages).

Du et al., "ShiDianNao: Shifting Vision Processing Closer to the Sensor," 2015 *ACM/IEEE 42nd Annual International Symposium on Computer Architecture (ISCA)*, Portland, Oregon, Jun. 13-17, 2015, pp. 92-104.

Erdem et al., "Design Space Exploration for Orlando Ultra Low-Power Convolutional Neural Network SoC," IEEE 29th International Conference on Application-specific Systems, Architectures and Processors, Milan, Italy, Jul. 10-12, 2018, 7 pages.

Github, "Building a quantization paradigm from first principles," URL=https://github.com/google/gemmlowp/blob/master/doc/quantization.md, download date Jul. 29, 2021, 7 pages.

(56) References Cited

OTHER PUBLICATIONS

Github, "The low-precision paradigm in gemmlowp, and how it's implemented," URL=https://github.com/google/gemmlowp/blob/master/doc/low-precision.md#efficient-handling-of-offsets, download date Jul. 29, 2021, 4 pages.

Gokhale et al., "A 240 G-ops/s Mobile Coprocessor for Deep Neural Networks (Invited Paper)," *The IEEE Conference on Computer Vision and Pattern Recognition (CVPR) Workshop*, Columbus, Ohio, Jun. 23-28, 2014, pp. 696-701.

Graf et al., "A Massively Parallel Digital Learning Processor," *Advances in Neural Information Processing Syste (NIPS)*, pp. 529-536, 2009.

Han et al., "Deep Compression: Compressing Deep Neural Networks with Pruning, Trained Quantization and Huffman Coding," International Conference on Learning Representations, San Juan, Puerto Rico, May 2-4, 2016, 14 pages.

Hou et al., "An End-to-end 3D Convolutional Neural Network for Action Detection and Segmentation in Videos," *Journal of Latex Class Files* 14(8):2015, 15 pages.

Hou et al., "Tube Convolutional Neural Network (T-CNN) for Action Detection in Videos," International Conference on Computer Vision, Venice Italy, Oct. 22-29, 2017, pp. 5822-5831.

Hu et al., "MaskRNN: Instance Level Video Object Segmentation," 31st Conference on Neural Information Processing Systems, Long Beach, California, Dec. 4-9, 2017, 10 pages.

Jagannathan et al., "Optimizing Convolutional Neural Network on Dsp," IEEE International Conference on Consumer Electronics, Jan. 7-11, 2016, Las Vegas, Nevada, pp. 371-372.

Jouppi et al., "In-Datacenter Performance Analysis of a Tensor Processing Unit," 44th International Symposium on Computer Architecture, Toronto, Canada, Jun. 26, 2017, 17 pages.

Kang et al., "T-CNN: Tubelets with Convolutional Neural Networks for Object Detection from Videos," arXiv:1604.02532: Aug. 2017, 12 pages.

Kiningham, K. et al., "Design and Analysis of a Hardware CNN Accelerator," Stanford University, 2017, 8 pages.

Krizhevsky et al., "ImageNet Classification with Deep Convolutional Neural Networks," Proceedings of the 25th International Conference on Neural Information Processing Systems 1:1097-1105, 2012 (9 pages).

Lascorz et al., "Tartan: Accelerating Fully-Connected and Convolutional Layers in Deep Learning Networks by Exploiting Numerical Precision Variability," arXiv:1707.09068v1: Jul. 2017, 12 pages.

LeCun et al., "Gradient-Based Learning Applied to Document Recognition," Proceedings of the IEEE 86(1):2278 2324, 1998.

Lin et al., "A Digital Circuit of Hyperbolic Tangent Sigmoid Function for Neural Networks," *IEEE International Symposium on Circuits and Systems*, Seattle, Washington, May 18-21, 2008, pp. 856-859.

Lin et al., "Network In Network," arXiv:1312.4400v3 [cs.NE], Mar. 4, 2014, 10 pages.

Meloni et al., "A High-Efficiency Runtime Reconfigurable IP for CNN Acceleration on a Mid-Range All-Programmable SoC," International Conference on ReConFigurable Computing and FPGAs (ReConFig), Nov. 30-Dec. 2, 2016, Cancun, Mexico, 8 pages.

Merritt, "AI Silicon Gets Mixed Report Card," EE Times, published online Jan. 4, 2018, downloaded on Jan. 15, 2018, from https://www.eetimes.com/document.asp?doc_id=1332799&print-yes, 3 pages.

Moctar et al., "Routing Algorithms for FPGAS with Sparse Intra-Cluster Routing Crossbars," 22nd International Conference on Field Programmable Logic and Applications (FPL), Aug. 29-31, 2012, Oslo, Norway, pp. 91-98.

NVIDIA Deep Learning Accelerator, "NVDLA," downloaded on Dec. 12, from http://nvdla.org/, 2019, 5 pages.

Redmon, "YOLO: Real-Time Object Detection," archived on Jan. 9, 2018, downloaded on Jul. 23, 2019, https://web.archive.org/web/20180109074144/https://pjreddie.com/darknet/yolo/, 11 pages.

Ren et al., "Faster R-CNN: Towards Real-Time Object Detection with Region Proposal Networks," arXiv:1506.01497v3, Jan. 2016, 14 pages.

Salakhutdinov et al., "A Better Way to Pretrain Deep Boltzmann Machines," Advances in Neural Processing Systems 25, Lake Tahoe, Nevada, Dec. 3-8, 2012, 9 pages.

Scardapane et al., "Kafnets: kernel-based non-parametric activation functions for neural networks," arXiv:1707.04035v2, Nov. 2017, 35 pages.

Sim et al., "14.6: A 1.42TOPS/W Deep Convolutional Neural Network Recognition Processor for Intelligent IoE Systems," International Solid-State Circuits Conference, San Francisco, Californai, Jan. 31-Feb. 4, 2016, pp. 264-266.

Simonyan et al., "Very Deep Convolutional Networks for Large-Scale Image Recognition," International Conference on Learning Representations, San Diego, California, May 7-9, 2015, 14 pages.

Stenström, "Reducing Contention in Shared-Memory Multiprocessors," *Computer* 21(11):26-37, 1988.

Stoutchinin et al., "Optimally Scheduling CNN Convolutions for Efficient Memory Access," *IEEE Transactions on Computer-Aided Design of Integrated Circuits and Systems*, Feb. 4, 2019, 14 pages.

TensorFlow "How to Quantize Neural Networks with TensorFlow," archived on Sep. 25, 2017, downloaded on Jul. 23, 2019 from https://web.archive.org/web/20170925162122/https://www.tensorflow.org/performance/quantization, 10 pages.

Tsang, "Review: DeconvNet—Unpooling Layer (Semantic Segmentation)," published online Oct. 8, 2018, downloaded on Dec. 12, 2019, from https://towardsdatascience.com/review-deconvnet-unpooling-layer semantic-segmentation-55cf8a6e380e, 7 pages.

UFLDL Tutorial, "Pooling," downloaded from http://deeplearning.stanford.edu/tutorial/supervised/Pooling/ on Dec. 12, 2019, 2 pages.

Vassiliadis et al., "Elementary Function Generators for Neural-Network Emulators," *IEEE Transactions on Neural Networks* 11(6):1438-1449, 2000.

Vu et al., "Tube-CNN: Modeling temporal evolution of appearance for objest detection in video," arXiv:1812.02619v1, Dec. 2018, 14 pages.

Wang et al.(Ed)., *Advances in Neural Networks*, Springer Verlag, Berlin, Germany, 2006, pp. 1319-1327, Larkin et al., "An Efficient Hardware Architecture for a Neural Network Activation Fucntion Generator".

Wang et al., "DLAU: A Scalable Deep Learning Accelerator Unit on FPGA," *IEEE Transactions on Computer-Aided Design of Integrated Circuits and Systems* 36(3):2017, 5 pages.

Wikipedia, "Convolutional neural network," downloaded from https://en.wikipedia.org/wiki/Computer_vision on Dec. 12, 2019, 29 pages.

Xu et al., "R-C3D: Region Convolutional 3D Network for Temporal Activity Detection," arXiv:1703.07814v2, Aug. 2017, 10 pages.

Zhong, K. et al., "Exploring the Potential of Low-bit Training of Convolutional Neural Networks," *IEEE Transactions on Computer-Aided Design of Intergrated Circuits and Systems*, arXiv:2006.02804, version 4, p. 1-13.

\* cited by examiner

NEURAL NETWORK HARDWARE ACCELERATOR CIRCUIT WITH REQUANTIZATION CIRCUITS

BACKGROUND

Technical Field

The present disclosure generally relates to convolutional neural networks implemented in sensor systems.

Description of the Related Art

Deep learning algorithms promote very high performance in numerous applications involving recognition, identification and/or classification tasks, however, such advancements may come at the price of significant usage of processing power. Thus, their adoption can be hindered by a lack of availability of low-cost and energy-efficient solutions. Accordingly, severe performance specifications may coexist with tight constraints in terms of power and energy consumption while deploying deep learning applications on embedded devices.

BRIEF SUMMARY

Embodiments of the present disclosure provide a neural network that utilizes requantization of tensor data between layers of the neural network. The tensor data may initially be quantized in a first quantization format and provided to a first layer of the neural network for processing. After the first layer has processed the quantized tensor data, the data is passed to a requantization unit or circuit. The requantization unit requantizes the data into a same quantization format, a new quantization format, or both the same quantization format and the new quantization format. The requantized data is then passed to the next layer of the neural network.

The requantization process provides many benefits. In some cases, a layer, process, or unit of neural network may more efficiently process data if quantization factors such as scaling and offset are changed from a previous layer. In some cases, a layer, process, or unit of a neural network may more efficiently process data if an entirely different quantization format is utilized. In some cases, it may be beneficial for two parallel layers, units, or processes to receive data from a previous layer in different quantization formats. Embodiments of the present disclosure provide the flexibility to requantize tensor data in a variety of ways between layers, processes, or units of a neural network.

In some embodiments, the neural network is a convolutional neural network (CNN). Each layer of the CNN includes a convolution process, an activation process, and a pooling process. Requantization units may be implemented after the convolution process, the activation process, the pooling process, or after each of these processes.

In some embodiments, a CNN network includes convolution circuitry configured to generate a plurality of convolution values by performing a convolution operation on a plurality of quantized input values. The CNN includes first requantization circuitry coupled to the convolution circuitry and configured to generate a plurality of first quantized output values in a first quantization format by performing a first quantization process on the convolution values.

In some embodiments, a method includes receiving, at a first layer of a neural network, an input tensor including a plurality of quantized input data values and generating intermediate data values from the input tensor values by performing a first operation on the quantized data values. The method includes generating, at the first layer, a first output tensor including a plurality of first quantized output data values. The generating includes by performing a first requantization process on the intermediate data values.

In some embodiments, an electronic device includes a neural network. The neural network includes a stream link configured to provide tensor data including a plurality of quantized input data values and a hardware accelerator configured to receive the tensor data and to generate intermediate data values by performing an operation on the quantized input data values. The neural network includes requantization circuitry configured to generate a plurality of quantized output data values by performing a requantization operation on the intermediate data values.

In some embodiments, a non-transitory computer-readable medium having contents which configure a hardware accelerator of convolutional neural network to perform a method. The method includes receiving an input tensor including a plurality of quantized input data values, and generating intermediate data values from the input tensor values by performing a first operation on the quantized data values. The method includes generating a first output tensor including a plurality of first quantized output data values. The generating includes performing a first requantization process on the intermediate data values.

DETAILED DESCRIPTION

Figure 1:
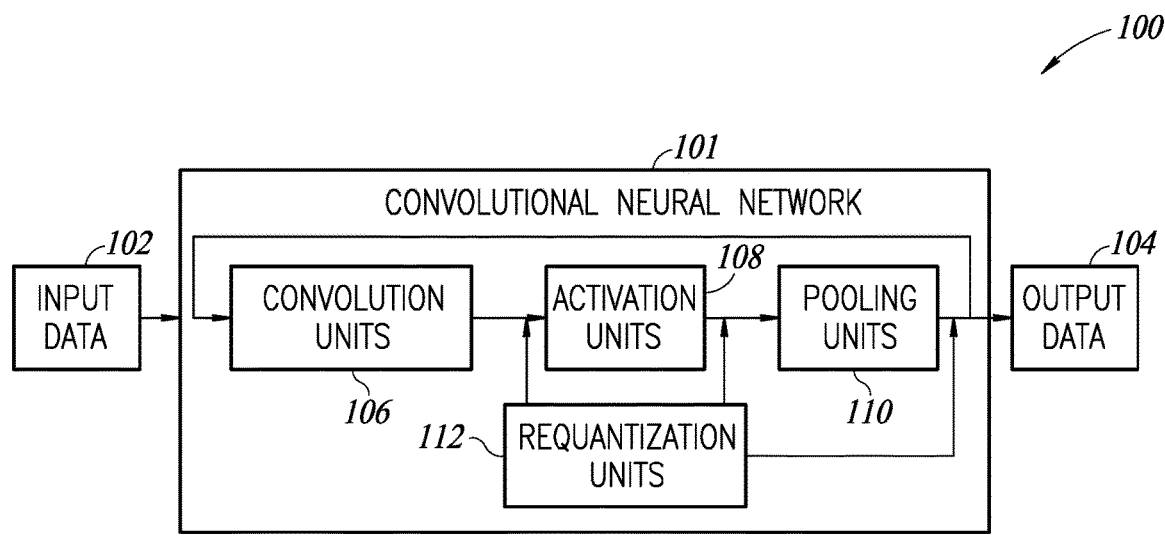
FIG. 1 is a block diagram of an electronic device, according to some embodiments.

FIG. 1 is a block diagram of an electronic device 100, according to some embodiments. The electronic device 100 includes a convolutional neural network (CNN) 101. The CNN 101 receives input data 102 and generates output data 104 based on the input data 102. The CNN 101 generates the output data 104 by performing one or more convolution operations on the input data 102.

In one embodiment, the input data 102 is provided by an image sensor (not shown) or another type of sensor of the electronic device 100. Accordingly, the input data 102 can include image data corresponding to one or more images captured by the image sensor. The image data is formatted so that it can be received by the CNN 101. The CNN 101 analyzes the input data 102 and generates the output data 104. The output data 104 indicates a prediction or classification related to one or more aspects of the image data. The output data 104 can correspond to recognizing shapes, objects, faces, or other aspects of an image.

While various examples herein focus on a CNN 101 implemented in conjunction with an image sensor, the CNN 101 may be implemented in conjunction with other types of sensors without departing from the scope of the present disclosure, or various combinations of types of sensors. Additionally, the CNN 101 may process data other than sensor data without departing from the scope of the present disclosure. Furthermore, machine learning networks or processes other than CNNs can be utilized without departing from the scope of the present disclosure.

In one embodiment, the CNN 101 is trained with a machine learning process to recognize aspects of training images that are provided to the CNN 101. The machine learning process includes passing a plurality of training images with known features to the CNN. The machine learning process trains the CNN 101 to generate prediction data that accurately predicts or classifies the features of the training images. The training process can include a deep learning process.

The CNN 101 includes a plurality of convolution units or circuits 106, activation units 108, and pooling units 110. The convolution units 106 implement convolution layers of the CNN 101. Accordingly, each convolution unit 106 is the hardware block that implements the convolution operations corresponding to a convolution layer of the CNN 101. Each activation unit 108 is a hardware block that implements an activation operation after the convolution operation. Each pooling unit 110 is a hardware block that implements pooling functions between the convolution layers. The convolution units 106, the activation units 108, and the pooling units 110 cooperate in generating output data 104 from the input data 102.

In one embodiment, each convolution unit 106 includes a convolution accelerator. Each convolution unit 106 performs convolution operations on feature data provided to the convolution unit 106. The feature data is generated from the input data 102. The convolution operations at a convolution layer convolve the feature data with kernel data generated during the machine learning process for the CNN 101. The convolution operations result in feature data that is changed in accordance with the kernel data.

The data from the convolution unit 106 is provided to an activation unit 108. The activation unit 108 performs activation operations on the data from the convolution unit 106. The activation operation can include performing nonlinear operations on data values received from the convolution unit 106. One example of an activation operation is a rectified linear unit (ReLU) operation. Other types of activation operations can be utilized without departing from the scope of the present disclosure.

The pooling unit 110 receives feature data from the activation unit 108. The pooling unit 110 performs pooling operations on the feature data received from the activation unit 108. Pooling operations are performed on the feature data to prepare the feature data for the convolution operations of the next convolution layer. The pooling unit 110 performs the pooling operations between convolution layers. The pooling unit 110 is used to accelerate convolutional neural network operations. The pooling unit 110 can perform max pooling operations, minimum pooling operations, average pooling operations, or other types of pooling operations.

The CNN 101 utilizes tensor data structures for the feature data. The input of each unit 106, 108, and 110 is an input tensor. The output of each unit 106, 108, and 110 is an output tensor with different data values than the input tensor.

In one example, the convolution unit 106 receives an input tensor and generates an output tensor. The activation unit 108 receives, as an input tensor, the output tensor of the convolution unit 106 and generates an output tensor. The pooling unit 110 receives, as an input tensor, the output tensor of the activation unit 108 and generates an output tensor. The output tensor of the pooling unit 110 may be passed to the convolution unit 106 of the next convolution layer. 106

Tensors are similar to matrices in that they include a plurality of rows and columns with data values in the various data fields. A convolution operation generates an output tensor of the same dimensions as the input tensor, though with different data values. An activation operation generates an output tensor of the same dimensions as the input tensor, though with different data values. A pooling operation generates an output tensor of reduced dimensions compared to the input tensor.

A pooling operation takes a portion, such as a pooling window, of a feature tensor and generates a pooled sub-tensor of reduced dimension compared to the pooling operation. Each data field in the pooled sub-tensor is generated by performing a particular type of mathematical operation on a plurality of data fields (such as taking the maximum value, the minimum value, or the average value from those data fields) from the feature tensor. The pooling operations are performed on each portion of the feature tensor. The various pooling sub-tensors are passed to the next convolution layer as the feature tensor for that convolution layer. Accordingly, pooling helps to reduce and arrange data for the next convolution operation.

Continuing with the example of an image sensor, the image sensor may output sensor data of a plurality of floating-point data values. The floating-point data values may utilize large amounts of memory or may otherwise be unwieldy or inefficient to process with the CNN 101. Accordingly, before the sensor data is arranged into an input tensor, the floating-point data values may undergo a quantization process. The quantization process converts each floating-point data value to a quantized data value. The quantized data value may have reduced numbers of bits compared to the floating-point data values, may be changed to integers, or may otherwise be changed in order to promote efficient processing by the CNN 101.

Various quantization formats can be utilized for the input data 102. One possible quantization format is scale/offset format. Another possible quantization format is fixed point format. There may be various advantages to using either of these formats. Further details regarding these quantization formats are provided in relation to FIGS. 4A-4C. While the description and figures primarily describe scale/offset and fixed point quantization formats, other quantization formats can be utilized without departing from the scope of the present disclosure.

The CNN 101 includes a plurality of requantization units 112. FIG. 1 illustrates the requantization units 112 as being outside the path between the convolution units 106 the activation units 108, and the pooling unit 110. However, in practice, the requantization units are typically positioned between the various hardware units of the CNN 101. For example, a requantization unit 112 may be positioned directly between the convolution unit 106 and an activation unit 108. In other words, the output of the convolution unit is passed to a requantization unit 112. The requantization unit 112 performs a requantization operation on the data values of the output tensor of the convolution unit 106 and then passes the requantized tensor values to the activation unit 108.

A requantization unit 112 may be positioned between an activation unit 108 and the subsequent pooling unit 110. The requantization unit 112 receives the output tensor from the activation unit 108, performs a requantization operation on the data values of the output tensor of the activation unit 108, and passes the requantized tensor to the pooling unit 110.

A requantization unit 112 may be positioned between the pooling unit 110 and the subsequent convolution unit 106. The requantization unit 112 receives the output tensor of the pooling unit 110, performs a requantization operation on the data values of the output tensor of the pooling unit 110, and passes the requantized tensor to the convolution unit 106.

The CNN 101 may include a single requantization unit 112 positioned between two of the hardware units 106, 108, and 110. The CNN 101 may include multiple requantization units 112 positioned between various of the hardware units 106, 108, and 110.

In one example, a requantization unit 112 is positioned between the first convolution unit 106 and the first activation unit 108. The input data 102 has been quantized in a scale/offset format including a scaling factor and an offset. The convolution unit 106 performs the convolution operation on the quantized input tensor and generates an output tensor. The requantization unit 112 can requantize the data values of the output tensor of the convolution unit 106 into a different quantization format, for example, a fixed point quantization format. Alternatively, the requantization unit 112 can requantize the data values of the output tensor of the convolution unit 106 into the scale/offset format but with a different scaling factor and a different offset. Alternatively, there can be two requantization units positioned at the output of the convolution unit 106. One of the requantization units 112 can requantize the output tensor into a scale/offset format. The other requantization unit 112 can requantize the output tensor into a fixed point quantization format. If there are two requantization units 112 that receive the output of the convolution unit 106, one of the requantization units 112 may pass its requantized tensor to the activation unit 108 while the other requantization unit 112 may pass its requantized tensor to a different unit of the CNN 101, or to a process or system outside the CNN 101. Requantization units 112 can be positioned in the same manner at the outputs of activation units 108 and pooling units 110.

As used herein, the term "requantization" may be used interchangeably with the term "quantization". In practice, each requantization unit 112 is simply a quantization unit that performs a quantization operation. The term "requantization" is utilized because the quantization units may perform quantization on data values that were previously quantized, or on data values generated from previously quantized data values.

For simplicity, the CNN 101 of FIG. 1 illustrates convolution units 106, activation units 108, pooling units 110, and requantization units 112. However, in practice, the CNN 101 may include many other hardware blocks. These other hardware blocks can include batch normalization blocks, scaling blocks, biasing blocks, normalization blocks, buffers, stream switches, and other types of hardware blocks that perform various operations as part of the CNN 101.

As used herein, the term "convolution unit" can be used interchangeably with "convolution circuit" or "convolution circuitry". As used herein, the term "pooling unit" can be used interchangeably with "pooling circuit" or "pooling circuitry". As used herein, the term "activation unit" can be used interchangeably with "activation circuit" or "activation circuitry". As used herein, the term "requantization unit" can be used interchangeably with "requantization circuit" or "requantization circuitry". This is because convolution units 106, the activation units 108, the pooling units 110, and the requantization units 112 are hardware circuits.

Further details related to electronic devices implementing convolutional neural networks can be found in U.S. Patent Application Publication 2019/0266479, filed Feb. 20, 2019, in U.S. Patent Application Publication No. 2019/0266485, filed Feb. 20, 2019, and in U.S. Patent Application Publication No. 2019/0266784, filed Feb. 20, 2019.

Figure 2:
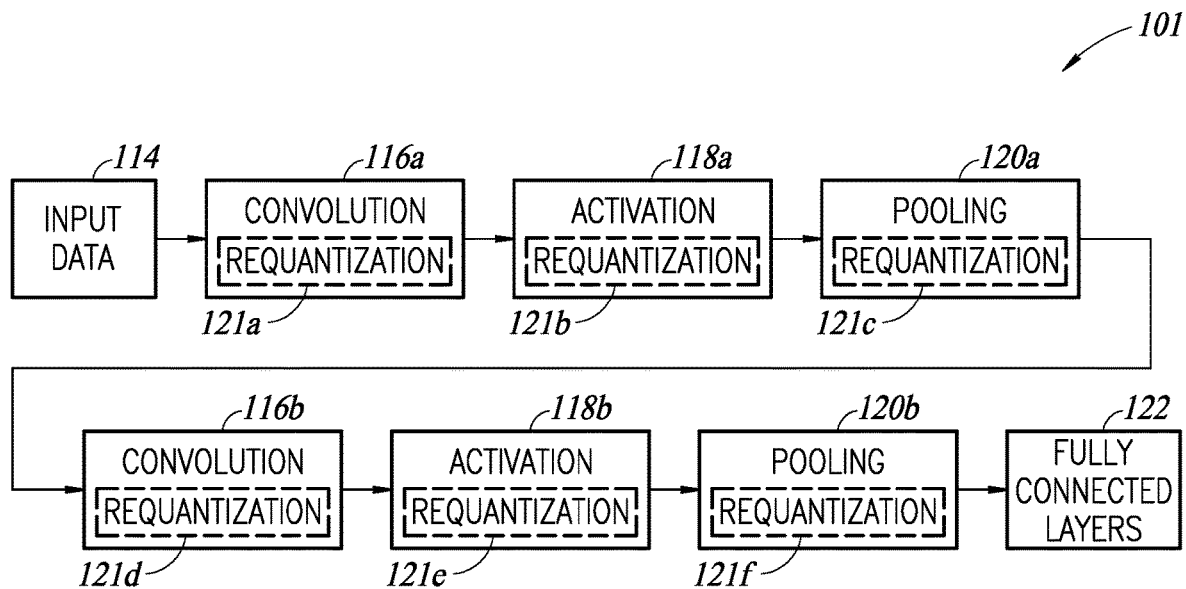
FIG. 2 is a block diagram of process flow within a CNN, according to some embodiments.

FIG. 2 is a simplified block diagram of process flow within a CNN 101, according to one embodiment. The CNN 101 includes an input layer 114, convolution layers 116*a* and 116*b*, activation layers 118*a* and 118*b*, pooling layers 120*a* and 120*b*, and one or more fully connected layers 122. The input data 102 is provided to the input layer 114 and is passed through various convolution layers 116*a* and 116*b*, the activation layers 118*a* and 118*b*, the pooling layers 120*a* and 120*b*, and the fully connected layers 122. The output of the final fully connected layer 122 is the output data 104. Each of the convolution layers 116*a* and 116*b*, activation layers 118*a* and 118*b*, and pooling layers 120*a* and 120*b* may include a respective requantization process 121*a-f*.

In one embodiment, the first convolution layer 116*a* receives feature data from the input layer 114. The feature data for the first convolution layer 116*a* is the input data 102. The first convolution layer 116*a* generates feature data from the input data 102 by performing convolution operations between the feature tensors of the input data 102 and the kernel tensors of the first convolution layer 116*a*. The output of the first convolution layer 116*a* is also called feature data herein.

The first convolution layer 116*a* also includes a requantization process 121*a*. The requantization process 121*a* may be performed on the feature data that is generated by the convolution operation associated with the first convolution layer 116*a*. The requantization process 121*a* may generate feature data in a same quantization format, a different quantization format, or both in a same quantization format and a different quantization format.

The convolution process and the requantization process 121*a* of the convolution layer 116*a* may collectively make up the convolution layer 116*a*. The convolution process and the requantization process of the convolution layer 116*a* may be performed by a convolution unit 106 and a requantization unit 112 as described in relation to FIG. 1.

The first convolution layer 116*a* passes the requantized feature data to the activation layer 118*a*. The activation layer 118*a* performs an activation process on the requantized feature data from the convolution layer 116*a*. The activation process can include performing a nonlinear mathematical operation on each of the quantized data values from the feature tensor. As set forth previously, one example of a nonlinear mathematical operation is a ReLU operation.

The activation layer 118*a* also includes a requantization process 121*b*. The requantization process 121*b* may be performed on the feature data that is generated by the activation operation associated with the activation layer 118*a*. The requantization process 121*b* may generate feature data in a same quantization format, a different quantization format, or both in a same quantization format and a different quantization format.

The activation process and the requantization process 121*b* of the activation layer 118*a* may collectively make up the activation layer 118*a*. The activation process and the requantization process of the activation layer 118a may be performed by an activation unit 108 and a requantization unit 112 as described in relation to FIG. 1.

The activation layer 118a passes the requantized feature data to the pooling layer 120a. The pooling layer 120a performs a pooling operation on the feature data received from the activation layer 118a. The pooling operation can include reducing the dimensions of the feature tensor by performing one or more of a max pooling operation, a minimum pooling operation, and average pooling operation, or other types of pooling operations.

The pooling layer 120a also includes a requantization process 121c. The requantization process 121c may be performed on the feature data that is generated by the pooling operation associated with the pooling layer 120a. The requantization process 121c may generate feature data in a same quantization format, a different quantization format, or both in a same quantization format and a different quantization format.

The pooling operation and the requantization process 121c of the pooling layer 120a may collectively make up the pooling layer 120a. The pooling operation and the requantization process of the pooling layer 120a may be performed by a pooling unit 110 and a requantization unit 112.

The second convolution layer 116b receives feature data from the pooling layer 120a. The first convolution layer 116b generates feature data from the pooling layer 118a by performing convolution operations between the feature tensors of the pooling layer 118a and the kernel tensors of the second convolution layer 116b.

The second convolution layer 116b also includes a requantization process 121d. The requantization process 121d may be performed on the feature data that is generated by the convolution operation associated with the second convolution layer 116b. The requantization process 121d may generate feature data in a same quantization format, a different quantization format, or both in a same quantization format and a different quantization format.

The convolution process and the requantization process 121d of the convolution layer 116b may collectively make up the convolution layer 116b. The convolution process and the requantization process of the convolution layer 116b may be performed by a convolution unit 106 and a requantization unit 112 as described in relation to FIG. 1.

The convolution layer 116b passes the requantized feature data to the activation layer 118b. The activation layer 118b performs an activation process on the requantized feature data from the convolution layer 116b. The activation process can include performing a nonlinear mathematical operation on each of the quantized data values from the feature tensor.

The activation layer 118b also includes a requantization process 121e. The requantization process 121e may be performed on the feature data that is generated by the activation operation associated with the activation layer 118b. The requantization process 121e may generate feature data in a same quantization format, a different quantization format, or both in a same quantization format and a different quantization format.

The activation process and the requantization process 121e of the activation layer 118b may collectively make up the activation layer 118b. The activation process and the requantization process of the activation layer 118b may be performed by an activation unit 108 and a requantization unit 112 as described in relation to FIG. 1.

The activation layer 118b passes the requantized feature data to the pooling layer 120b. The pooling layer 120b performs a pooling operation on the feature data received from the activation layer 118b. The pooling operation can include reducing the dimensions of the feature tensor by performing one or more of a max pooling operation, a minimum pooling operation, and average pooling operation, or other types of pooling operations.

The pooling layer 120b also includes a requantization process 121f. The requantization process 121f may be performed on the feature data that is generated by the pooling operation associated with the pooling layer 120b. The requantization process 121f may generate feature data in a same quantization format, a different quantization format, or both in a same quantization format and a different quantization format.

The pooling operation and the requantization process 121f of the pooling layer 120b may collectively make up the pooling layer 120b. The pooling operation and the requantization process 121f of the pooling layer 120b may be performed by a pooling unit 110 and a requantization unit 112.

Figure 3:
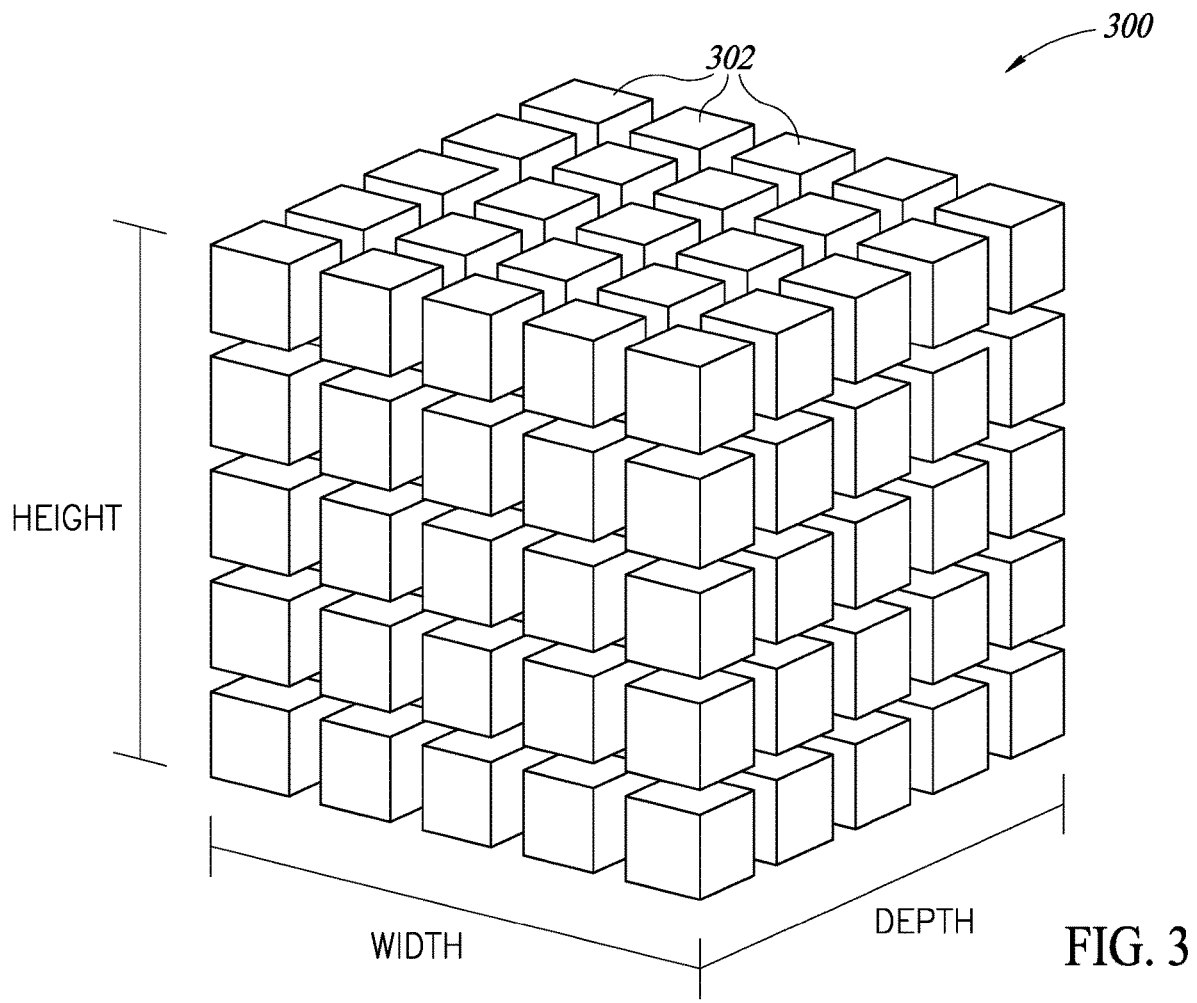
FIG. 3 is a representation of a feature tensor, according to some embodiments.

While each layer shown in FIG. 2 includes a requantization process, in practice, one or more of the layers may not include a requantization process. Furthermore, the CNN 101 may include more layers than shown in FIG. 2. In practice, the CNN 101 includes other processes than those shown in FIG. 2. In particular, the CNN 101 may include batch normalization operations, scaling operations, biasing operations, normalization operations, activation operations, and other types of operations FIG. 3 is a representation of a feature tensor 128, according to one embodiment. The feature tensor 128 includes a plurality of blocks 302. Each of these blocks 302 represents a data value. The tensor 128 includes height, width, and depth. While the feature tensor 128 of FIG. 3 illustrates a 5×5×5 tensor, in practice, the feature tensor 128 may include other height, width, and depth dimensions.

In one embodiment, during the various convolution, activation, pooling, and requantization operations, the feature tensor 128 is divided into batches. The feature tensor 128 may be batched by height, width, or depth. Convolution, activation, pooling, and requantization operations are performed on the batches from the feature tensor. Each batch may be considered a sub-tensor of the feature tensor 128.

Figure 4A:
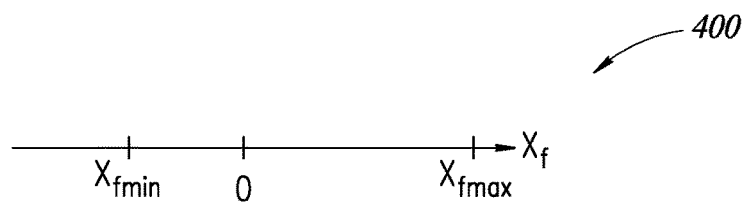
FIGS. 4A-4C are graphs illustrating principles of quantization, in accordance with some embodiments.

FIG. 4A is a graph 400 illustrating a range of floating-point values $x_f$, in accordance with some embodiments. The floating-point values $x_f$ may correspond to the sensor data initially received by a CNN 101 prior to quantization. The floating-point values have a range between a minimum floating-point value $x_{fmin}$ and a maximum floating-point value $x_{fmax}$. The graph 400 illustrates that $x_{fmin}$ is less than zero and $x_{fmax}$ is greater than zero.

In the example of the graph 400, the range of positive values of $x_f$ is greater than the range of negative values of $x_f$. One way to look at this is that the absolute value of $x_{fmax}$ is greater than the absolute value of $x_{fmin}$. In one example, $x_f$ is an eight bit number that can have values between −128 and 128. $x_{fmax}$ may be 128, while $x_{fmin}$ may be −14. Thus, there is a large amount of the range of negative values that are unused in FIG. 4A.

Figure 4B:
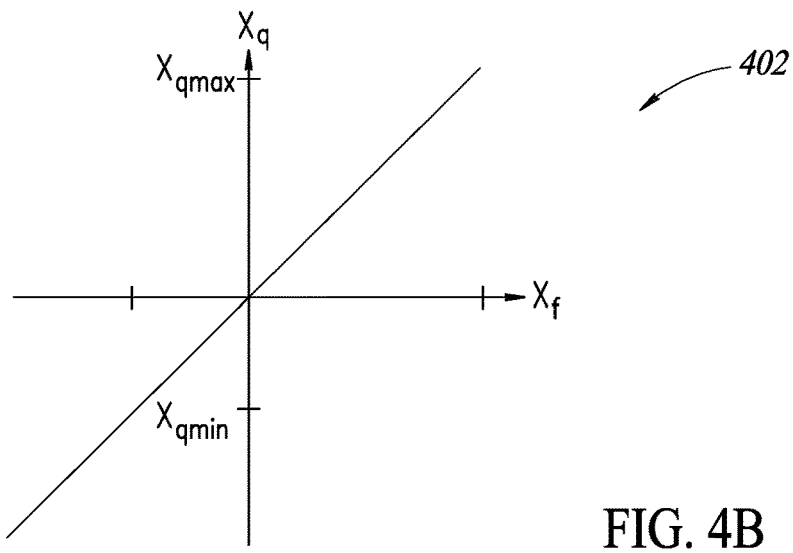

FIG. 4B is a graph 402 illustrating a range of quantized values $x_q$ in accordance with a fixed point quantization scheme, in accordance with some embodiments. In the fixed point quantization scheme, each value $x_f$ is quantized into a corresponding value $x_q$. The floating-point values $x_f$ correspond to the horizontal axis of the graph 402. The quantized values $x_q$ correspond to the vertical axis of the graph 402.

Fixed point quantization is typically performed by multiplying each value $x_f$ by a scaling value. Typically, the scaling value is a multiple of 2.

One characteristic of fixed point quantization is that the ranges of positive and negative values will have similar characteristics as the range of positive and negative values of the floating-point values $x_f$ from which the quantized values $x_q$ are generated. Just as the range of negative values of $x_f$ is less than the range of positive values of $x_f$, the range of negative values of $x_q$ is less than the range of positive values of $x_q$. This can be understood by noting that the absolute value of the lowest quantized value $x_{qmin}$ is less than the absolute value of the highest quantized value $x_{qmax}$. Accordingly there is a similarly large range of unused negative values for the fixed point quantization scheme represented in the graph 402.

Figure 4C:
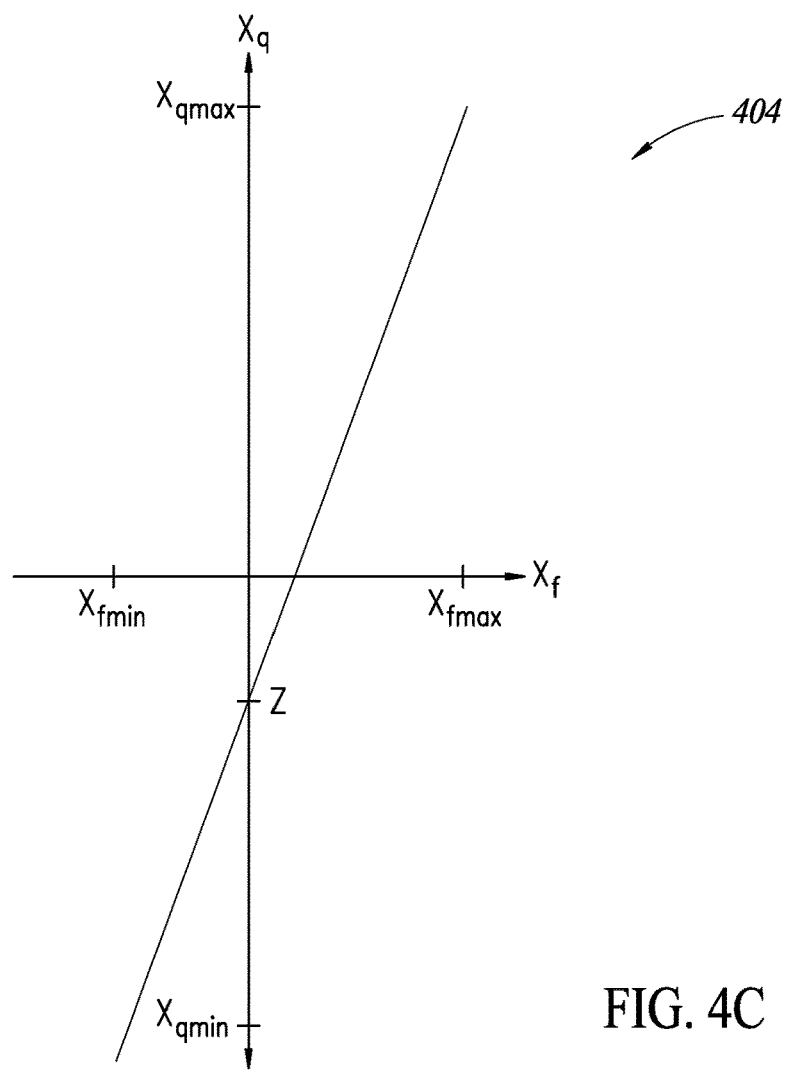

FIG. 4C is a graph 404 illustrating a range of quantized values $x_q$ in accordance with a scale/offset quantization scheme, in accordance with some embodiments. In the scale/offset quantization scheme, the quantized values are generated in accordance with a scaling factor s and a zero offset z. The value of z corresponds to a y-intercept of the quantized values. The scaling factor is the inverse of the slope.

One benefit of the scale/offset quantization scheme is that the full range of positive and negative values is utilized. The absolute value of the minimum quantized value $x_{qmin}$ is approximately the same as the absolute value of the maximum quantized value $x_{qmax}$ in the scale/offset quantization scheme. Accordingly, the value of z and the scaling factor can be selected based on the $x_{fmin}$ and $x_{fmax}$ in order to provide quantized values that utilize the full range of positive and negative data values available in the corresponding bit range associated with the scale/offset quantization scheme. The number of bits for each scale/offset quantized value $x_q$ may be the same or less than the number of bits for each floating-point value $x_f$.

Figure 5A:
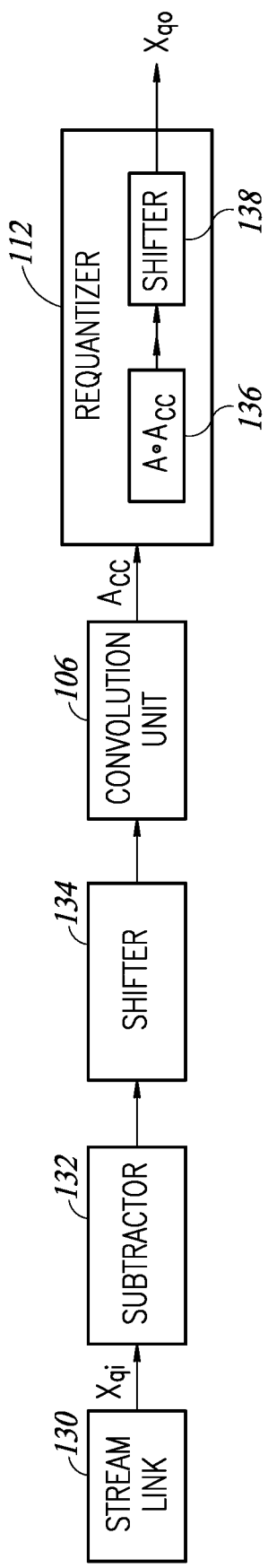
FIG. 5A-5C are block diagrams of convolution layers of a CNN, in accordance with some embodiments.
Figure 5B:
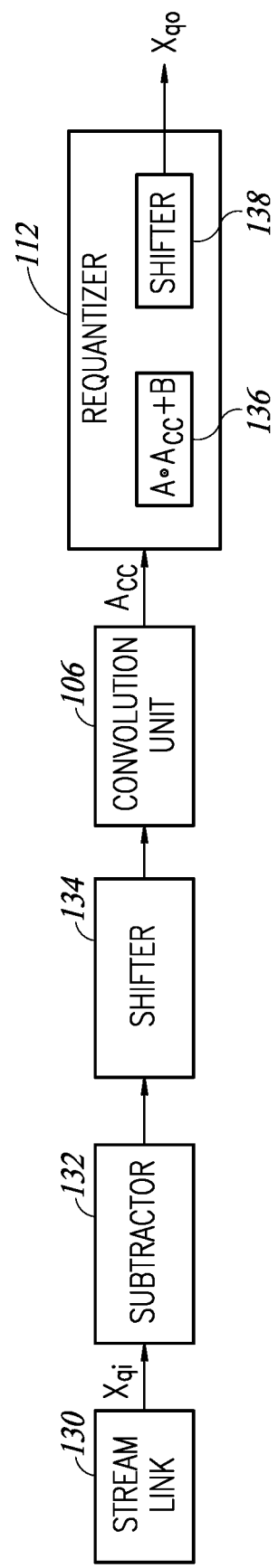
Figure 5C:
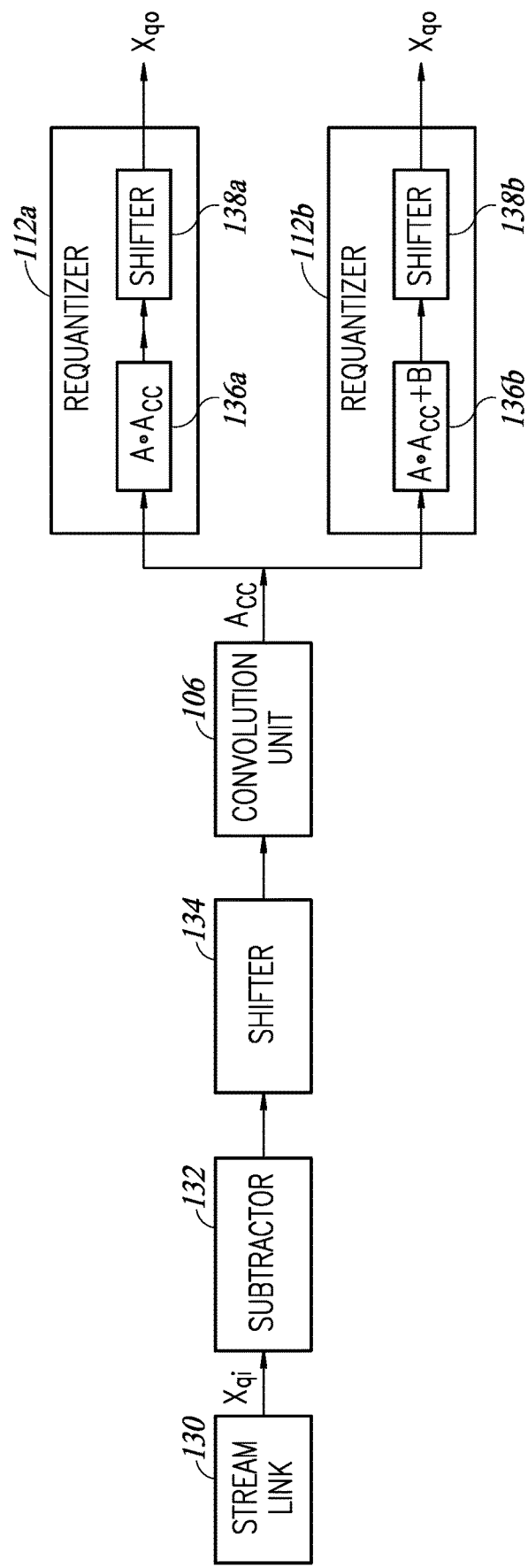

FIGS. 5A-5C represent convolution units of a CNN together with requantization units, in accordance with some embodiments. Prior to discussing FIGS. 5A-5C, it is beneficial to describe some relationships associated with quantization from floating point values, and requantization of a quantized value. For the discussion of FIGS. 5A-5C, floating point values $x_f$ are related to scale/offset quantized values $x_q$ by the following general relationship:

$$x_f = s(x_q - z), \tag{1a}$$

where s is the scaling factor and z is the zero offset. In the following discussion, terms with a suffix "i" correspond to input values at a convolution layer. Terms with a suffix "o" correspond to output values of a requantization operation. If the values at the input have been previously quantized, then the floating point values $x_f$ from which quantized input values $x_{qi}$ were generated can be related to the quantized input values $x_{qi}$ by the following relationship:

$$x_f = s_i(x_{qi} - z_i), \tag{1b}$$

where $s_i$ is the input scaling factor and $z_i$ is the input zero offset associated with a quantization operation that occurred prior to the convolution layer.

A convolution operation of a floating point value has the following general formula:

$$Conv = \Sigma_n x_f * w_f, \tag{2}$$

where $w_f$ is a floating point weighting value associated with the convolution operation, Cony is the output of the convolution operation, and the index n refers to a particular value or place within a tensor. Rewriting equation 2 using equation 1b for $x_f$ and rewriting the floating point weighting value $w_f$ in a scale/offset format provides the following:

$$Conv = \Sigma_n s_i(x_{qi} - z_i) * s_w(w - z_w), \tag{3}$$

where w is scale/offset weighting value, $s_w$ is the scaling factor associated with the weighting value $w_f$ in scale/offset format, and $z_w$ is the zero offset of the weighting value $w_f$ in the scale offset format. The following relationships are useful in simplifying the convolution value:

$$X_i = (x_{qi} - z_i) \text{ and } W = (w - z_w). \tag{4}$$

The convolution value can now be represented in the following relationship:

$$Conv = (s_i * s_w) \Sigma_n X_i * W. \tag{5}$$

Further, if we rename the value inside the sum as ACC in the following manner:

$$Acc = \Sigma_n X_i * W, \tag{6}$$

We can then represent the convolution value in the following manner:

$$Conv = (s_i * s_w) Acc. \tag{7}$$

Introducing a requantization unit operation onto the convolution operation, the value from equation 7 can be represented in the following manner:

$$s_o(x_{qo} - z_o) = (s_i * s_w) Acc, \tag{8}$$

where $s_o$ is the output scaling factor associated with a requantization process, $x_{qo}$ is the quantized value generated by the requantization process, and $z_o$ is the output zero offset associated with the requantization operation.

If we introduce a saturation operation onto the output quantized value, the output quantized value can be represented in the following relationship:

$$x_{qo} = SAT(A * Acc + B), \tag{9}$$

where SAT is a saturation operation that forces $x_{qo}$ to be represented in a desired number of bits (e.g. 8b or 16b), A is $(s_i * s_o)/s_w$, and B is the output zero offset represented in a selected number of bits.

FIG. 5A illustrates a convolution unit 106 of a CNN 101, in accordance with some embodiments. A stream link 130 provides the quantized values $x_{qi}$ of an input tensor. The input tensor can be received from a previous pooling layer, from a previous activation layer, or from an initial quantization operation. In any case, the data values in the tensor are provided by the stream link 130 as a stream of quantized input values $x_{qi}$. FIG. 5A illustrates a subtractor 132 and a shifter 134 positioned between the stream link 130 and the convolution unit 106. While the subtractor 132 and the shifter 134 are shown as separate hardware blocks from the convolution unit 106, in practice, the subtractor 132 and the shifter 134 may be part of the convolution unit 106.

The convolution scheme shown in FIG. 5A illustrates a requantization operation associated with the convolution unit 106. A requantization unit 112 is coupled to the convolution unit 106. The requantization unit 112 requantizes data values from the convolution unit 106. Although the requantization unit 112 is shown as a separate hardware block from the convolution unit 106, in some cases the requantization unit 112 may be considered part of the convolution unit 106. The requantization unit 112 requantizes the output of the convolution unit 106. Furthermore, in practice, the subtractor 132 and the shifter 134 may be considered as part of the requantization unit 112.

In the example of FIG. 5A, the requantization unit 112 requantizes the output of the convolution unit 106 into a fixed point quantization scheme. If values $x_{qi}$ from the stream link 130 were previously in a scale/offset format, the subtractor 132 may subtract a value corresponding to the zero offset zi of the input quantization scheme. The shifter 134 may shift the data values received from the subtractor 132 back down to a smaller number of bits. For example, the quantized input values $x_{qi}$ from the stream link 130 may initially have 8-bit values. The subtractor 132 may be a 24-bit subtractor and could generate 25-bit values while subtracting the input zero offset $z_i$. The shifter 134 shifts the data values from the subtractor 132 back into eight bit values. If the quantized input values $x_{qi}$ provided from the stream link 130 are in a fixed point quantization scheme, then the subtractor 132 may be selectively configured to subtract a value of zero. Because there is no Z-offset in the fixed point quantization scheme, the input Z-offset $z_i$ can be considered to be zero.

The convolution unit 106 receives the quantized input values $x_{qi}$ after processing by the subtractor 132 and the shifter 134. The convolution unit 106 performs the convolution operation on each of the quantized input values $x_{qi}$. The convolution operation corresponds to multiplying each quantized value by a weighting factor. The output of the convolution unit 106 is ACC. Each data value output by the convolution unit 106 is given the notation ACC because the convolution unit 106 may be considered a convolution accelerator.

The requantization unit 112 receives the values ACC and performs a requantization operation. The requantization unit 112 can be considered an arithmetic unit including arithmetic sub-units 136 and 138. An arithmetic sub-unit 136 multiplies each value ACC by a value. As described previously, the value A corresponds to an input scaling factor associated with the initial quantization that resulted in the quantized input values $x_{qi}$ and a scaling factor $s_w$ associated with the weighting values of the convolution unit 106. If there is an output scaling factor so associated with the requantization, then the value A may correspond to $s_i * s_w / s_o$.

The sub-unit 136 provides the data values to the shifter 138. The shifter 138 can shift the data value up or down as desired. For example, the shifter 138 may saturate the values provided by the sub-unit 136 to a lower bit value (e.g. from 16-bit to 8-bit). The output of the requantization unit 112 is the requantized data values $x_{qo}$. In practice, the output of the requantization unit 112 of FIG. 5A can correspond to the output of the convolution layer. As set forth previously, the requantization unit 112 may be part of the convolution unit 106 such that the convolution unit 106 performs the convolution and requantization operation.

FIG. 5B is an illustration of a convolution unit 106 of a CNN 101, in accordance with some embodiments. The convolution operation of FIG. 5B is substantially similar to the convolution operation of FIG. 5A. The primary difference is that the requantization unit 112 of FIG. 5B requantizes the output of the convolution unit 106 into a scale/offset format rather than a fixed point quantization form. The sub-unit 136 of the requantization unit 112 of FIG. 5B multiplies each value ACC by the factor A and adds a value B. The factor A corresponds to an input scaling factor multiplied by a weighting scaling factor divided by an output scaling factor, as described previously. The value B corresponds to the Z-offset $z_o$ of the scale/offset quantization format of the requantization unit 112.

FIG. 5C is an illustration of a convolution unit 106 of the CNN 101, in accordance with some embodiments. The convolution operation of FIG. 5C is different from the convolution operations of FIGS. 5A and 5B in that there are two requantization units 112a and 112b coupled to the convolution unit 106. The first requantization unit 112a is similar to the requantization unit 112 of FIG. 5A. The second requantization unit 112b is similar to the requantization unit 112 of FIG. 5B. Each of the requantization units 112a and 112b receive the values ACC from the convolution unit 106. The requantization unit 112a requantizes the values ACC in accordance with a fixed point quantization scheme as described in relation to FIG. 5A. The requantization unit 112b requantizes the values ACC in accordance with a scale/offset quantization scheme as described in relation to FIG. 5B. Accordingly, the convolution layer FIG. 5C receives quantized input data values in accordance with a first quantization format, performs the convolution operation on the input quantized data values, and generates output quantized data values $x_{qo}$ in the first quantization format and in the second quantization format.

Figure 6:
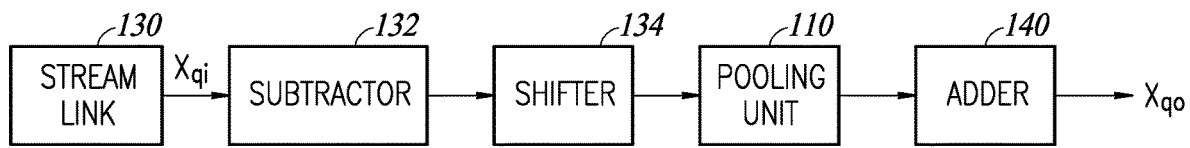
FIG. 6 is a block diagram of a pooling layer of a CNN, in accordance with some embodiments.

FIG. 6 is an illustration of a pooling operation of a CNN 101, in accordance with some embodiments. In FIG. 6, a pooling unit 110 receives quantized data values $x_{qi}$ from the stream link 130. Prior to proceeding with a description of the components of FIG. 6, it is beneficial to introduce some relationships associated with pooling operations on floating point values, pooling operations on quantized values $x_{qi}$, and requantization of pooled values. The following discussion is related primarily to average pooling operations. However, other types of pooling operations can be utilized without departing from the scope of the present disclosure.

An average pooling value y of n floating point values $x_f$ of an input tensor can be represented by the following relationship:

$$y = \frac{1}{n} \sum_n x_f. \qquad (10)$$

Substituting equation 1b into equation 10 provides the following relationship:

$$y = \frac{s_i}{n} \sum_n x_{qi} - \frac{s_i}{n} \sum_n z_i. \qquad (11)$$

Let the quantity C be defined in the following manner:

$$C = \frac{s_i}{n} \sum_n z_i. \qquad (12)$$

Let the quantity Xi be defined in the following manner:

$$X_i = (x_{qi} - z_i). \qquad (13)$$

The output Acc of the pooling unit 110 can be given in the following manner:

$$ACC = \frac{1}{n} \sum_n X_i. \qquad (14)$$

Requantization can be performed in accordance with the following relationship:

$$s_o(x_o - z_o) = s_i * Acc - C. \qquad (15)$$

More particularly, requantized output values in scale/offset format can be generated in accordance with the following relationship:

$$x_{qo} = \frac{s_i}{s_o} * Acc + \left(z_o - \frac{C}{s_o}\right). \quad (16)$$

Requantization into fixed point offset can be performed in following manner:

$$x_{qo} = \frac{s_i}{s_o} * Acc - C. \quad (17)$$

Returning to the description of FIG. 6, the quantized input data values $x_{qi}$ may be the data values of a tensor output by a convolution layer or an activation layer. The quantized input data values $x_{qi}$ may be in a fixed point format or scale/offset format. Similar to the convolution layer shown in FIGS. 5A-5C, the pooling layer includes a subtractor 132 and the shifter 134. The subtractor 132 subtracts a zero offset value $z_o$ associated with the previous quantization process. The shifter 134 shifts data values to a desired number of bits.

The pooling unit 110 performs a pooling operation on the data values received from the shifter. Typically, the pooling operation can include reducing the dimensions of the input tensor. This can be done by performing minimum pooling operations, maximum pooling operations, average pooling operations, or other types of pooling operations in which multiple data values from the input tensor are combined into a single data value in a smaller output tensor.

The pooling unit 110 may generate data values ACC. However, prior to outputting the data values ACC, the pooling unit 110 may multiply each data value ACC by a factor A corresponding to an input scaling factor divided by the product of an output scaling factor and a pooling factor. The pooling factor may correspond to the number of data values from the input tensor that are combined into a single output value in the output tensor. The adder 140 adds in the zero offset value associated with the new or next or following quantization operation. If the new quantization operation is a scale/offset quantization operation, then the adder adds in the zero offset value $z_o$. If the new quantization operation is a fixed point quantization operation, then the adder adds in a value of zero. A portion of the requantization operation is performed by the pooling unit 110 in the illustrated embodiment. The adder 140 corresponds to an arithmetic block that adds in the equivalent of B from FIGS. 5B and 5C or can be an independent adder circuit. The adder 140, the shifter 134, and the subtraction unit 132 may collectively be a requantization unit 112.

Figure 7:
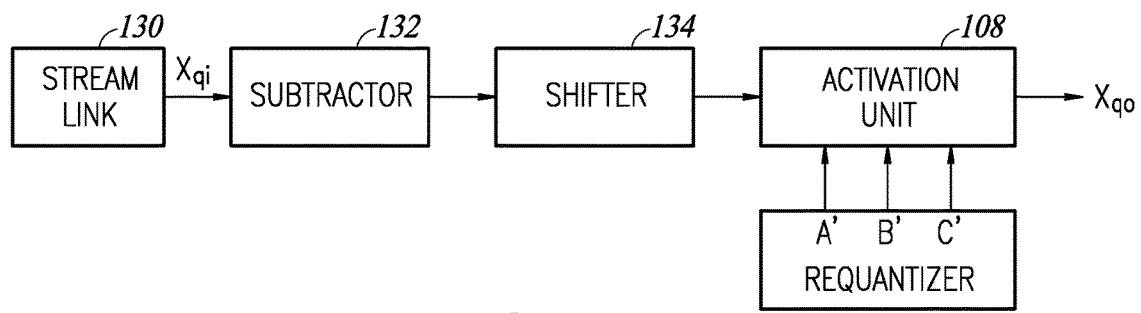
FIG. 7 is a block diagram of an activation process of a CNN, in accordance with some embodiments.

FIG. 7 corresponds to an activation layer of a CNN 101, in accordance with some embodiments. The activation layer performs an activation operation on tensor values received from the convolution operation. The tensor values are quantized input values $x_{qi}$ received from the stream link 130. Before describing the components of the activation layer of FIG. 7, it is beneficial to describe some relationships associated with non-linear activation of floating point and quantized values.

In some embodiments, the activation unit 108 uses a second degree polynomial to perform a non-linear transformation on input values. Beginning with the case of floating point input values $x_f$, a non-linear function $y(xf)$ may be applied to the floating point values xf in accordance with the following relationship:

$$y(x_f)=(ax_f+b)x_f+c, \quad (18)$$

where a, b, and c are scalar coefficients. Introducing input quantization as described in equation 1b gives the following relationship:

$$y(x_f)=\{as_i(x_{qi}-z_i)+b\}s_i(x_{qi}-z_i)+c. \quad (19)$$

Now let us introduce the following relationships:

$$X_i=x_f-z_i, \quad (20)$$

$$A=as_i^2, \quad (21)$$

$$B=bs_i, \text{ and} \quad (22)$$

$$C=c. \quad (23)$$

This allows us to present the non-linear function in the following form:

$$y(x_f)=AX_i^2+BX_i+C \quad (24)$$

We can now requantize the result in the previous equation to as follows:

$$s_o(x_{qo}-z_o)=AX_i^2+BX_i+C. \quad (25)$$

Let us further introduce the following relationships:

$$A'=(a*s_i{}^2)/s_o, \quad (26)$$

$$B'=b*s_i/s_o, \text{ and} \quad (27)$$

$$C'=c/s_o+z_o. \quad (28)$$

We can now represent the quantized output values with the following relationship:

$$x_{qo}=A'X_i^2+B'X_i+C'. \quad (29)$$

Returning now to the description of FIG. 7, the activation layer includes a subtractor 132 and a shifter 134 positioned between the stream link 130 and the activation unit 108. The subtractor 132 of the shifter 134 perform the same operations described previously in relation to FIGS. 5A-6.

The activation unit 108 performs a nonlinear activation operation on each data value received from the previous convolution layer. The activation operation can utilize any general activation function. In one example, the activation operation is combined with the requantization unit 112 to perform an activation function and a requantization operation at the same time. The activation unit 108 receives the quantized input values $x_{qi}$ via the shifter 134 and generates the values A*X^2+B*X+C as described above. The requantization unit then requantizes these values with the values A', B', and C' as described above. The output of the activation unit 108 is requantized activated data values $x_{qo}$. Other types of activation and requantization can be utilized without departing from the scope of the present disclosure.

Figure 8:
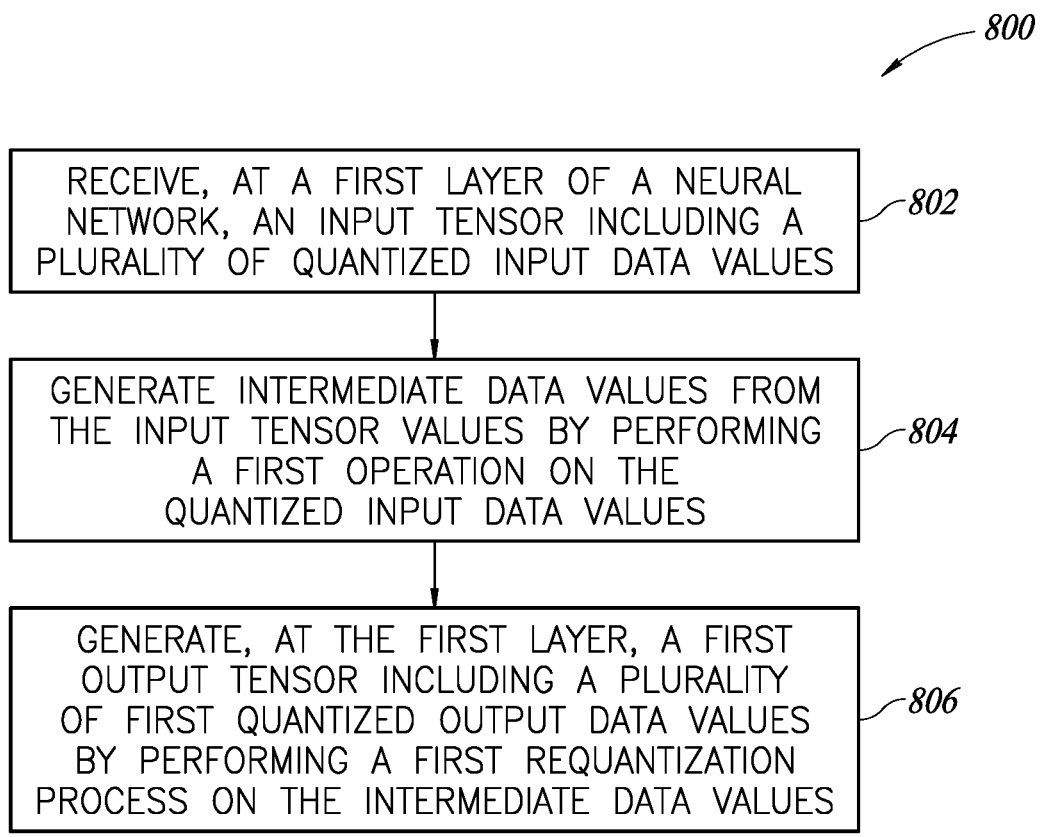
FIG. 8 is flow diagram of method for operating a CNN, in accordance with some embodiments.

FIG. 8 is a flow diagram of a method 800 for operating a CNN, in accordance with some embodiments. At 802, the method 800 includes receiving, at a first layer of a neural network, an input tensor including a plurality of quantized input data values. At 804, the method 800 includes generating intermediate data values from the input tensor values by performing a first operation on the quantized data values. At 806, the method 800 includes generating, at the first layer, a first output tensor including a plurality of first quantized output data values by performing a first requantization process on the intermediate data values.

Figure 9:
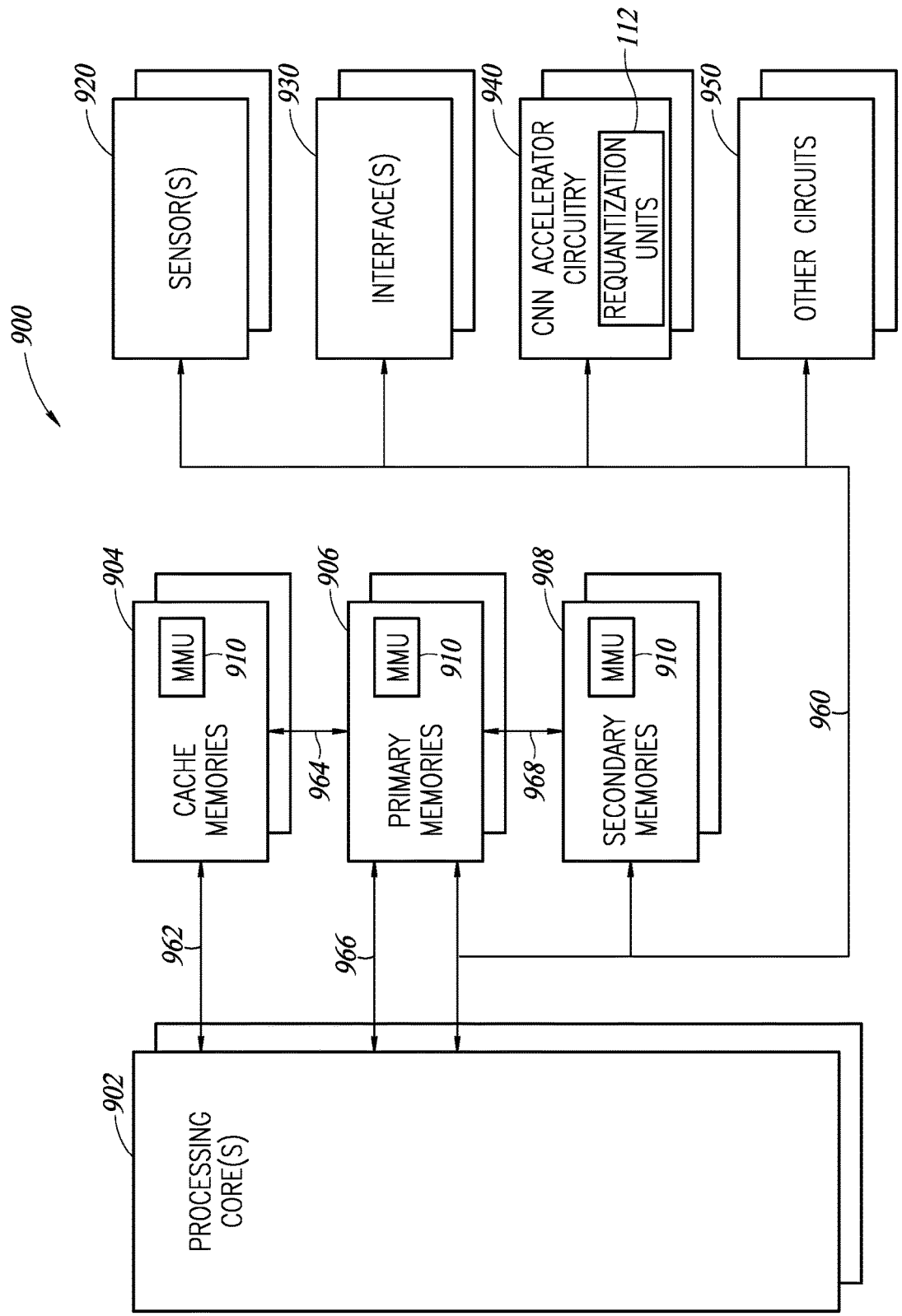
FIG. 9 is a functional block diagram of an electronic device or system, in accordance with some embodiments.

FIG. 9 is a functional block diagram of an electronic device or system 900, in accordance with some embodiments. The system 900 can be utilized to implement a CNN, components of a CNN, or processes involving a CNN as described in relation to FIGS. 1-8. The system 900 comprises one or more processing cores or circuits 902. The processing cores 902 may comprise, for example, one or more processors, a state machine, a microprocessor, a programmable logic circuit, discrete circuitry, logic gates, registers, etc., and various combinations thereof. The processing cores may control overall operation of the system 900, execution of application programs by the system 900, etc.

The system 900 includes one or more memories, such as one or more volatile and/or non-volatile memories which may store, for example, all or part of instructions and data related to control of the system 900, applications and operations performed by the system 900, etc. As illustrated, the system 900 includes one or more cache memories 904, one or more primary memories 906, and one or more secondary memories 908, each comprising memory management circuitry or MMUs 910. One or more of the memories 904, 906, 908 includes a memory array, which, in operation, may be shared by one or more processes executed by the system 900.

The system 900 may include one or more sensors 920 (e.g., image sensor, accelerometers, pressure sensors, temperature sensors, etc.), one or more interfaces 930 (e.g., wireless communication interfaces, wired communication interfaces, etc.), one or more ANN circuits, as illustrated convolutional neural network (CNN) accelerator circuits 940, and other circuits 950, which may include other functional circuits, antennas, power supplies, etc., and a main bus system 960. The accelerator circuits 940 can include convolution circuits, activation circuits, pooling circuits, and other circuits as described previously. The accelerator circuits 940 can include requantization circuits 112 as described previously.

The main bus system 960 may include one or more data, address, power and/or control buses coupled to the various components of the system 900. The system 900 also may include additional bus systems such as bus system 962, which communicatively couples the cache memory 904 and the processing core 902, bus system 964, which communicatively couples the cache memory 904 and the primary memory 906, bus system 966, which communicatively couples the primary memory 906 and the processing core 902, and bus system 968, which communicatively couples the primary memory 906 and the secondary memory 908.

The primary memory or memories 906 are typically the working memory of the system 900 (e.g., the memory or memories upon which the processing cores 902 work or upon which co-processors such as the CNN accelerator circuitry 940 work), and may typically be a volatile memory (e.g., DRAM) of a limited size storing code and data related to processes executed by the system 900. For convenience, reference herein to data stored in a memory may also refer to code stored in a memory. Non-volatile memories, such as SRAM, ReRAM, PCM, MRAM, FRAM, multilevel memories, etc., may be employed as or in the primary memory or memories in an embodiment. The secondary memory 908 may typically be a non-volatile memory, which stores instructions and data, which may be retrieved and stored in the primary memory 906 when needed by the system 900. The cache memory 904 may be a relatively fast memory compared to the secondary memory 908 and typically has a limited size, which may be larger than a size of the primary memory 906.

The cache memory 904 temporarily stores code and data for later use by the system 900. Instead of retrieving needed code or data from the secondary memory 908 for storage in the primary memory 906, the system 900 may check the cache memory 904 first to see if the data or code is already stored in the cache memory 904. A cache memory 904 may significantly improve performance of a system, such as the system 900, by reducing the time and other resources needed to retrieve data and code for use by the system 900. When code and data are retrieved (e.g., from the secondary memory 908) for use by the system 900, or when data or code are written (e.g., to the primary memory 906 or to the secondary memory 908), a copy of the data or code may be stored in the cache memory 904 for later use by the system 900. Various cache management routines may be employed to control the data stored in the cache memory or memories 904.

In some embodiments, a CNN network includes convolution circuitry configured to generate a plurality of convolution values by performing a convolution operation on a plurality of quantized input values. The CNN includes first requantization circuitry coupled to the convolution circuitry and configured to generate a plurality of first quantized output values in a first quantization format by performing a first quantization process on the convolution values.

In some embodiments, a method includes receiving, at a first layer of a neural network, an input tensor including a plurality of quantized input data values and generating intermediate data values from the input tensor values by performing a first operation on the quantized data values. The method includes generating, at the first layer, a first output tensor including a plurality of first quantized output data values. The generating includes by performing a first requantization process on the intermediate data values.

In some embodiments, an electronic device includes a neural network. The neural network includes a stream link configured to provide tensor data including a plurality of quantized input data values and a hardware accelerator configured to receive the tensor data and to generate intermediate data values by performing an operation on the quantized input data values. The neural network includes requantization circuitry configured to generate a plurality of quantized output data values by performing a requantization operation on the intermediate data values.

In some embodiments, a non-transitory computer-readable medium having contents which configure a hardware accelerator of convolutional neural network to perform a method. The method includes receiving an input tensor including a plurality of quantized input data values, and generating intermediate data values from the input tensor values by performing a first operation on the quantized data values. The method includes generating a first output tensor including a plurality of first quantized output data values. The generating includes performing a first requantization process on the intermediate data values.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A convolutional neural network (CNN), comprising: convolution circuitry, which, in
    operation, receives an input tensor including a plurality of quantized input data values in an input quantization format and generates a plurality of intermediate data values by performing a convolution operation on the plurality of quantized input values of the input tensor;
    first requantization circuitry coupled to an output of the convolution circuitry; and
    second requantization circuitry different from the first requantization circuitry and coupled to the output of the convolution circuitry, wherein,
    the first requantization circuitry, in operation, generates a first output tensor having a plurality of first quantized output values in a first output quantization format by performing a first requantization process on the generated plurality of intermediate data values; and
    the second requantization circuitry, in operation, generates a second output tensor having a plurality of second quantized output values in a second output quantization format by performing a second requantization process on the generated plurality of intermediate data values.

2. The CNN of claim 1, wherein the first output quantization format is a scale/offset quantization format and the second output quantization format is a fixed point quantization format.

3. The CNN of claim 1, wherein the input quantization format is a scale/offset format and the first output quantization format is the scale/offset quantization format.

4. The CNN of claim 1, wherein the input quantization format is a scale/offset format and the first output quantization format is a fixed point quantization format.

5. The CNN of claim 1, wherein the input quantization format is a fixed point quantization format and the first output quantization format is a scale/offset quantization format.

6. The CNN of claim 1, wherein the input quantization format is a fixed point quantization format and the first output quantization format is the fixed point quantization format.

7. The CNN of claim 1, comprising:
    a stream link configured to receive the quantized input values; and
    a subtractor positioned between the stream link and the convolution circuitry and configured to perform a subtraction operation on the quantized input values prior to the convolution operation.

8. The CNN of claim 7, comprising a shifter coupled between the subtractor and the convolution circuitry and configured to adjust a number of bits of the quantized input values prior to the convolution operation.

9. The CNN of claim 1, comprising pooling circuitry configured to generate a plurality of pooling values by performing a pooling operation on a plurality of second quantized input values; and
    third requantization circuitry coupled to the pooling circuitry and configured to generate a plurality of third quantized output values by performing a third quantization process on the pooling values.

10. The CNN of claim 1, further comprising activation circuitry configured to generate a plurality of activation values by performing an activation operation on a plurality of second quantized input values; and
    third requantization circuitry coupled to the activation circuitry and configured to generate a plurality of third quantized output values by performing a third quantization process on the activation values.

11. A method, comprising:
    receiving, at a first layer of a neural network, an input tensor including a plurality of quantized input data values;
    generating intermediate data values from the input tensor values by performing a first operation on the quantized data values;
    generating, at the first layer, a first output tensor including a plurality of first quantized output data values, the generating including by performing a first requantization process on the intermediate data values using first requantization circuitry; and
    generating, at the first layer, a second output tensor including a plurality of second quantized output data values by performing a second requantization process on the generated intermediate data values using second requantization circuitry different from the first requantization circuitry.

12. The method of claim 11, wherein the first operation is a convolution operation.

13. The method of claim 11, wherein the first operation is a pooling operation.

14. The method of claim 11, wherein the first operation is an activation operation.

15. The method of claim 11, wherein the first quantized output data values are in a first quantization format and the second quantized output data values are in a second quantization format.

16. The method of claim 15, wherein the first quantization format is a scale/offset format.

17. The method of claim 16, wherein the second quantization format is a fixed point format.

18. An electronic device, comprising a neural network, the neural network including:
    a stream link configured to provide an input tensor including a plurality of quantized input data values;
    a hardware accelerator configured to receive the input tensor and to generate intermediate data values from the input tensor by performing an operation on the quantized input data values;

first requantization circuitry coupled to an output of the hardware accelerator and configured to generate a plurality of first quantized output data values by performing a first requantization operation on the generated intermediate data values; and second requantization circuitry coupled to the output of the hardware accelerator and configured to generate a plurality of second quantized output data values by performing a second requantization operation on the generated intermediate data values.

19. The electronic device of claim 18, wherein the hardware accelerator is a convolution accelerator.

20. The electronic device of claim 18, wherein the first requantization circuitry includes arithmetic circuitry.

21. The electronic device of claim 18, wherein the hardware accelerator is a pooling accelerator.

22. The electronic device of claim 18, wherein the hardware accelerator is an activation accelerator.

23. A non-transitory computer-readable medium having contents which configure a hardware accelerator of convolutional neural network to perform a method, the method comprising:

receiving an input tensor including a plurality of quantized input data values;

generating intermediate data values from the input tensor values by performing a first operation on the quantized data values;

generating a first output tensor including a plurality of first quantized output data values, the generating including performing a first requantization process on the generated intermediate data values using first requantization circuitry; and generating a second output tensor including a plurality of second quantized output data values by performing a second requantization process on the generated intermediate data values using second requantization circuitry different from the first requantization circuitry.

24. The non-transitory computer-readable medium of claim 23, wherein the hardware accelerator is a convolution accelerator.

25. The method of claim 24, wherein the first operation is a convolution operation.

26. The method of claim 23, wherein the first operation is a pooling operation.

27. The method of claim 23, wherein the first operation is an activation operation.

* * * * *

UNITED STATES PATENT AND TRADEMARK OFFICE
CERTIFICATE OF CORRECTION

| | | |
|---|---|---|
| PATENT NO. | : 12,361,268 B2 | Page 1 of 1 |
| APPLICATION NO. | : 17/461626 | |
| DATED | : July 15, 2025 | |
| INVENTOR(S) | : Giuseppe Desoli et al. | |

It is certified that error appears in the above-identified patent and that said Letters Patent is hereby corrected as shown below:

In the Claims

<u>Column 18, Claim 10, Line 20:</u>
"claim 1, further comprising" should read: --claim 1, comprising--.

Signed and Sealed this
Ninth Day of September, 2025

Coke Morgan Stewart
*Acting Director of the United States Patent and Trademark Office*